United States Patent Office 2,962,969
Patented Dec. 6, 1960

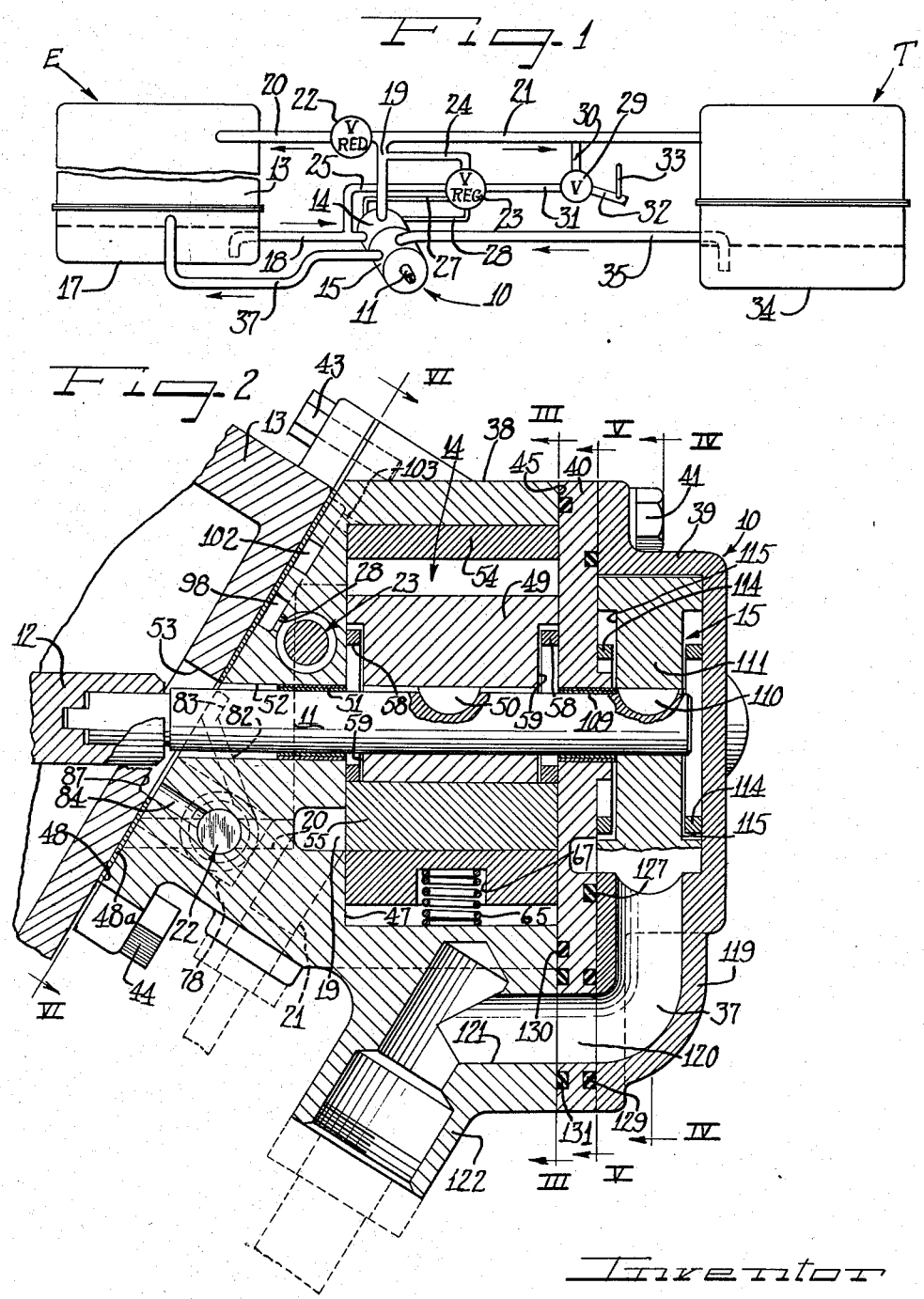

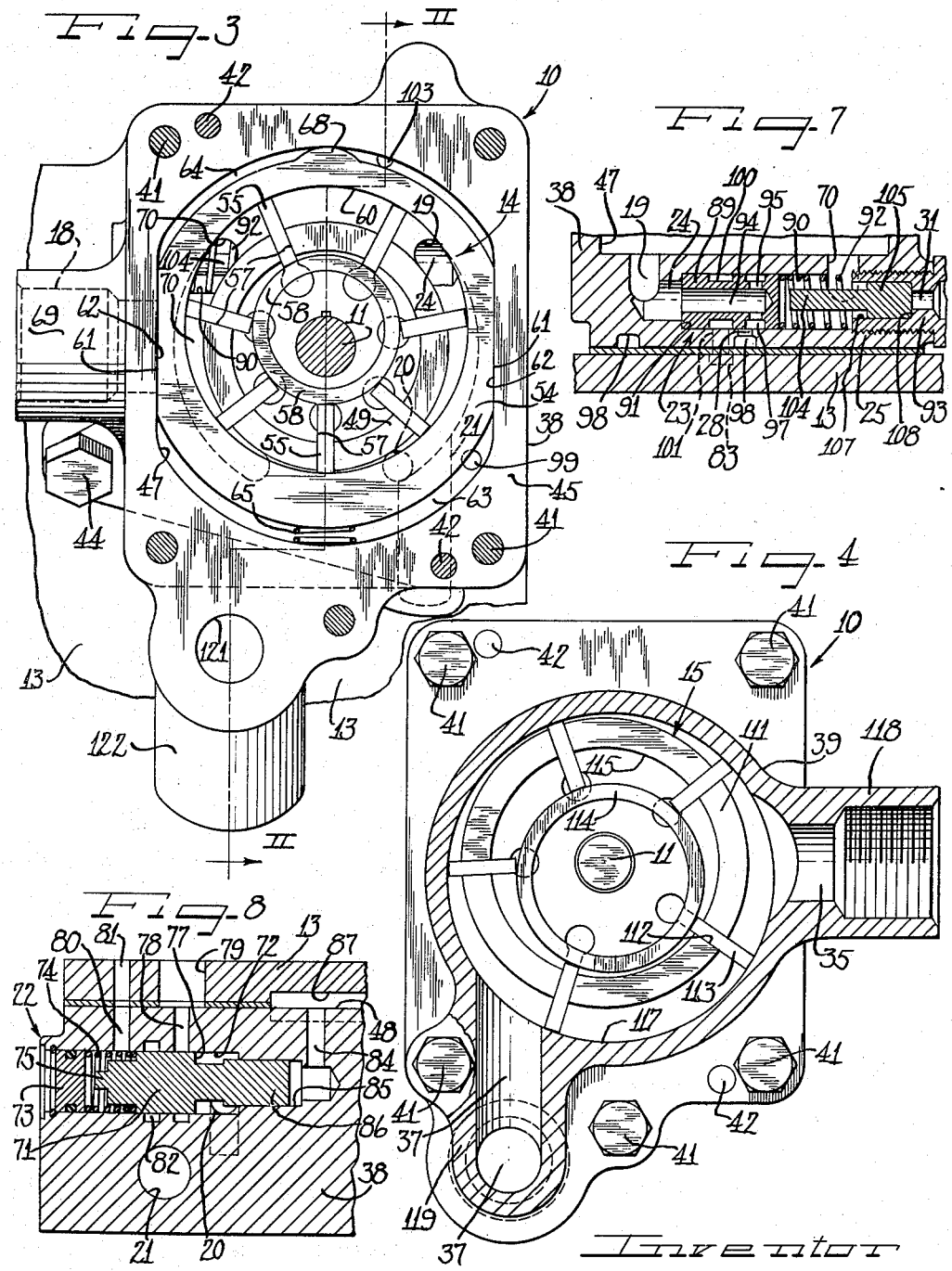

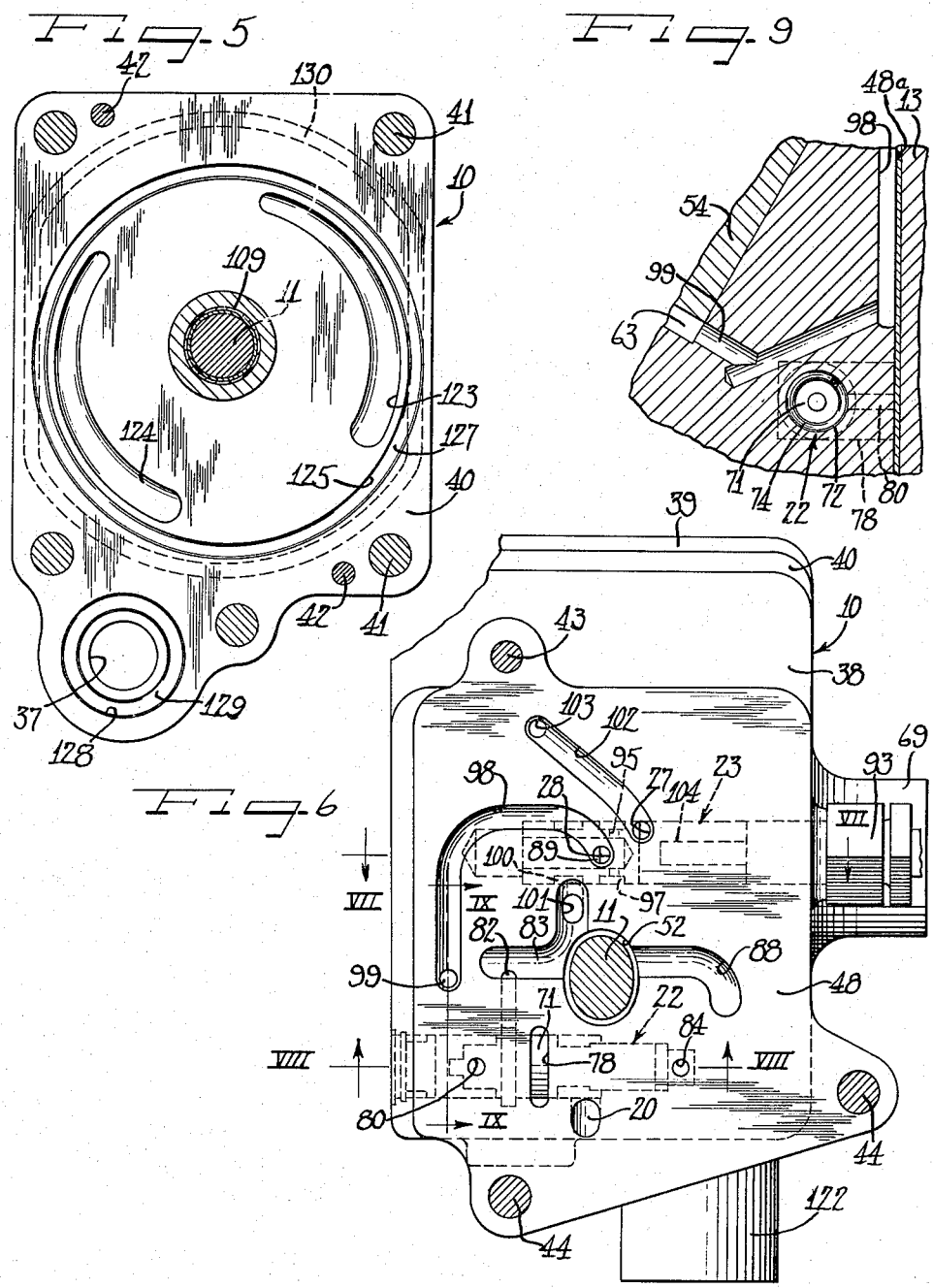

2,962,969

MEANS FOR SIMULTANEOUS FIXED AND VARIABLE DISPLACEMENT OF FLUID

Alfred G. French, Jr., Royal Oak, Mich., assignor to Houdaille Industries, Inc., a corporation of Michigan Filed June 14, 1954, Ser. No. 436,557

2 Claims. (Cl. 103—4)

The present invention relates to improvements in means for simultaneous fixed and variable displacement of fluid such as may be especially useful in connection with apparatus utilizing oil under pressure for different though correlated or cooperative, or at least conjointly operative purposes.

In automotive vehicles employing fluid drive transmissions, both the source of motive power, that is, the engine, and the transmission require hydraulic fluid in constant supply under pressure. It has heretofore been customary to provide a plurality of separate or at least individual hydraulic pressure systems for creating the desired hydraulic pressure, and more particularly for engine lubrication and for transmission operation. This has been so even under conditions and operating requirements enabling use of the same oil for both engine lubrication and hydraulic transmission operation.

The prior arrangement has therefore entailed complexities of design, multiplication of pumping units and therefore of the motivating means or drive shafts required therefor, with the attendant high equipment costs, uneconomic operation, maintenance difficulties, and the like.

An important object of the present invention is to provide a central fluid motivating and pressure system motivated by a single power source or mechanism and functioning in a novel manner not only to displace hydraulic fluid under fixed displacement between coordinated, cooperative, or contemporaneously operating fluid utilizing units, but also to supply such units with individual variable pressure fluid requirements in operation.

Another object of the present invention is to provide a variable displacement pump system for simultaneously providing from a common fluid source fluid supplies under different pressures to different operating units.

A further object of the invention is to simplify and consolidate or centralize the hydraulic system for both engine lubrication and transmission operation in automotive vehicles.

Still another object of the invention is to provide a combination variable displacement constant pressure and constant displacement pump unit.

A still further object of the invention is to provide a variable displacement and constant multiple pressure pump unit.

Yet another object of the invention is to improve the general construction and operation of variable displacement constant pressure pump units.

It is also an object of the invention to provide an unusually simple, compact, economical and efficiently operable combination, single shaft fixed and variable displacement pump assembly.

Other objects, features and advantages of the present invention will be apparent from the following detailed description of an exemplary embodiment of the invention taken in conjunction with the accompanying drawings, in which:

Figure 1 is a schematic illustration of an operational assembly or organization embodying individual though contemporaneously, cooperatively, or coordinately operable units, such, for example, as an automotive vehicle engine and a hydraulic transmission employing a common or central hydraulic system in accordance with the present invention;

Figure 2 is a substantially vertical sectional view through a pump unit adapted for use in the system of Figure 1, and taken generally on the line II—II of Figure 3;

Figure 3 is a sectional elevational view taken substantially on the line III—III of Figure 2;

Figure 4 is a sectional elevational view taken substantially on line IV—IV of Figure 2;

Figure 5 is a sectional elevational view taken substantially on the line V—V of Figure 2;

Figure 6 is a sectional elevational view taken substantially on the line VI—VI of Figure 2;

Figure 7 is a fragmentary sectional view taken substantially on the line VII—VII of Figure 6;

Figure 8 is a fragmentary sectional elevational view taken substantially on the line VIII—VIII of Figure 6; and Figure 9 is a fragmentary sectional elevational view taken substantially on the line IX—IX of Figure 6.

As shown schematically in Figure 1 a single pump unit 10 is operable to accommodate hydraulic fluid displacement and pressure conditions or requirements in both an engine E and a transmission T which may, for example, comprise cooperable and functionally integrated components of an automotive vehicle such as an automobile wherein the engine drives the transmission for propelling the vehicle. In addition, the engine E in suitable manner drives the pump unit 10 which for this purpose is provided with a driven shaft 11 which has an end arranged to be drivingly coupled to a driving shaft 12 (Fig. 2) such, for example, as the distributor shaft of the internal combustion engine which may rotate at one-half engine speed. For this purpose, the pump unit 10 is preferably mounted on the underside of the engine block, herein identified at 13.

Herein, the pump unit 10 comprises two simultaneously operable pump means or sections operated by the shaft 11 and comprising a variable displacement constant pressure pump section or member 14 and a fixed or positive displacement pump member or section 15. The variable displacement constant pressure pump member 14 operates to draw oil from a supply source such as a sump 17 of the engine E on the lower part of the engine block 13 through the medium of a suction conduit or duct 18 leading from the sump 17 to the pump section 14. The oil derived is driven under pressure by the pump section 14 into a delivery passage or duct 19 from which one branch 20 leads to the engine E and another branch 21 leads to the transmission T.

Since different oil pressures are required for engine lubrication and converter charge, and for transmission replenishment and charge, means are provided for automatically controlling pump delivery for these different purposes. To this end, a reducing valve structure 22 is provided in the pressure fluid branch duct 20 leading to the engine E which will automatically assure proper operating pressure, in a typical instance ranging from about 20 pounds per square inch at engine idling speed to a maximum operating or running speed pressure for the engine of 35 pounds per square inch. Since substantially higher operational pressures are required for the transmission T, in a typical instance ranging from 50 pounds per square inch to 90 pounds per square inch, a regulating valve structure 23 is provided which, in the present instance, directly controls both the pressure and volume or displacement output of the pump 14, inasmuch as the primary purpose of the pump section 14 is to supply the transmission fluid requirements.

In an efficient arrangement, the displacement and pressure controlling or regulating valve 23 is constructed and arranged for automatic adjustment in response to pump created pressure effective through a suitable direct pressure exposure connection 24 from the pump discharge passage 19 to the valve. In order to afford sensitivity of the valve 23 to dynamic pressure fluid from the pump, a connection is provided to negative or low pressure as by means of a duct or connection 25 leading from the valve to the low pressure side of the pump section 14 as, for example, the suction passage 18. Respective pump-controlling pressure shunt ducts 27 and 28 lead from the regulating valve structure 23 to the pump section 14. Thereby, responses of the valve structure 23 to variations in pump pressure will be reflected through the shunt ducts 27 and 28 in regulatory variations in pump displacement, for example, to maintain a given fluid displacement or volume supply such as, in a typical instance, approximately one and one-half gallons per minute to the transmission T at all speeds of operation of the associated vehicle.

For controlling pump discharge in proportion to variable service requirements under certain conditions, the regulating valve 23 may be controlled, as for example, in a given relationship to throttle opening of the internal combustion engine with which it is associated. For this purpose a control valve 29 is connected by a duct 30 to the high pressure conduit 19, 21 and to the valve assembly 23 by a pressure duct 31 and may be appropriately disposed to be operated through the medium of an operator such as a lever 32 arranged to be motivated by a connecting link or the like 33 leading from the throttle mechanism (not shown) of the associated vehicle. In a typical instance, it may be determined that the pump discharge pressure should be between 50 and 90 pounds per square inch from idling speed to high speed of the vehicle motivating system including the engine E and the transmission T.

In service the pump section 15 serves as a scavenge pump operating as a fixed or positive displacement fluid motivating means for pumping an air-oil mixture from a transmission sump 34 by way of a suction duct or conduit 35 leading operatively to the pump unit, from which the oil is then discharged through a conduit or duct 37 into the engine sump 17 where it becomes part of the main oil supply source. The oil in the transmission sump 34 is derived, of course, from transmission leakage or dumping incidental to its operation.

In an efficient, economical, compact construction, the pump unit 10 comprises a primary housing 38 for the variable displacement, constant pressure pump 14, a secondary housing member 39 for the fixed displacement pump 15, and a separator or divider plate member 40, in assembly all secured solidly together as by means of screws or bolts 41. Dowels 42 (Figs. 3, 4 and 5) may also be utilized for maintaining the housing components in proper assembly alignment. Attachment of the unit 10 to the engine block 13 may be effected by means of screws 43 and 44 (Figs. 2, 3 and 6).

In addition to the preferred three-part construction of the pump housing, compactness and efficiency are implemented by providing in the housing components accommodation for both of the valve structures 22 and 23 and also the several fluid passages, conduits, ducts, and ports by which communication with the pump sections and the valve structures is effected. In this connection the housing body member 38, in the present instance, comprises the principal component. For this purpose, one end of the housing body block member 38 is provided with a preferably flat face 45 (Figs. 2 and 3) within which is a substantial cavity or recess 47 for operatively housing the variable displacement, constant pressure pump assembly 14. At its opposite end the housing block 38 has a second preferably flat face 48 (Figs. 2 and 6) which, for the particular purpose and in view of a typical practical application, is disposed at an oblique angle relative to the face 45 and sloping from the top of the unit away from the face 45, whereby a substantial mass of the housing block 38 is provided between the inner wall defining the pump cavity 47 and the face 48, and more particularly between the cavity and the lower portion of the oblique face. It is the face 48 that is adapted to be secured to the engine block 13, and a sealing gasket 48a is preferably interposed between the opposed abutting engine block and housing block faces.

In a preferred form, the pump 14 is of the rotary sliding vane type. To this end the pump 14 comprises a circular rotor 49 concentrically mounted upon and corotatably keyed by means of a key 50 to an intermediate portion of the shaft 11 which projects concentrically through the pump cavity 47 and is rotatably supported by a bearing 51 within a bore 52 extending through the portion of the housing body 38 between the cavity 47 and the oblique face 48 for registration with a shaft clearance opening 53 through the engine block wall so that the pump shaft can be coupled corotatably with the driving shaft 12. In diameter the rotor 49 is substantially smaller than the diameter of the pump cavity or recess 47 so that a reciprocable modulator ring 54 can be accommodated in spaced relation about the rotor within the pump cavity. A uniformly spaced series of radially reciprocable vanes 55 slidably mounted in respective radial slots 57 in the rotor are maintained by floating backing rings 58, accommodated in respective larger diameter recesses 59 in the opposite ends of the rotor 49, in engagement at the outer ends with the circular wall defining a pump chamber 60 within the modulator 54.

For variable displacement reciprocal adjustment of the modulator 54, it is provided with parallel opposite flat longitudinal sides 61 slidably cooperable with parallel elongated flat bearing wall portions 62 defining opposite sides of the cavity 47. Longitudinally, the cavity 47 is longer than the length of the modulator 54. Thereby, the modulator divides the modulator chamber provided by the cavity 47 into opposite, herein lower and upper sub-chambers 63 and 64, respectively. By preference, and in the interest of conserving space, the opposing surfaces defining the opposite ends of the modulator 54 and the walls defining the sub-chambers 63 and 64 are of complementary arcuate shape.

Normally the modulator 54 is biased toward one end of the modulator chamber 47, herein toward the upper end, by means such as a coiled compression spring 65 thrusting at one end against the central portion of the wall defining the sub-chamber 63 and at its opposite end against the modulator within a socket 67 provided therefor. By preference the biasing thrust of the spring 65 is fairly light so that it actually comprises merely a priming bias to assure normal maximum eccentric relation of the pump chamber 60 relative to the rotor 49, thereby conditioning the pump 14 for maximum displacement. In this maximum displacement condition of the pump, the upper end of the modulator 54, as shown in Fig. 3, extends into the sub-chamber 64 to the maximum extent permitted by a limit stop boss 68 which thrusts against the wall defining the sub-chamber 64 and assures at all times at least a minimum spaced relation between the modulator and the wall of the sub-chamber 64.

When the shaft 11 is driven clockwise as viewed in Fig. 3, and the rotor 49 is thereby rotated in the same direction, action of the rotor blades or vanes 55 within the pump chamber 60 causes hydraulic fluid to be sucked from the motor sump 17 through the intake passage 18 which at least in part extends through one side of the housing member 38 by way of a laterally projecting boss 69 and communicates with an inlet or suction port 70 (Figs. 3 and 7) of generally arcuate or kidney shape recessed in the inner wall defining the modulator chamber 47 and located on the low pressure or suction side of the pump to feed into the gradually increasing volume space between the rotor and the pump chamber in the maximum eccentric relation of the modulator to the rotor. As the hydraulic fluid is carried toward the opposite diminishing volume side of the pump chamber by the pump vanes 55, the fluid is placed under pressure and is forced into the discharge passage 19 which comprises in its principal part an arcuate, kidney shaped port recessed into the inner wall defining the modulator chamber 47, in counterpart to the low pressure port 70 but disposed on the high pressure side of the pump for reception of the pressure fluid as impelled by the pump.

From the high pressure passage port 19, the high pressure fluid passes in major volume through the passage or duct 21 in part extending through the lower portion of the housing member 38 and thence through suitable conduit means serving as an extension of the housing portion of the passage 21, to the transmission T. A smaller volume of the pressure fluid passes from the high pressure passage port 19 into the engine lubrication passage 20 which also extends through and is provided as primarily a bore in the lower portion of the housing member 38 with a blind end directed through the face 48 of the housing member 38 and normally closed off in assembly by the gasket 48a (Figs. 2 and 6).

Herein, the valve structure 22 is mounted in the lower portion of the housing member 38 in controlling relation to the pressure passage 20 (Figs. 2, 6 and 8). To this end the valve structure 22 comprises a reciprocable plunger valve member 71 longitudinally slidably reciprocably mounted in a bore 72 provided in the housing member 38 in intersecting relation to the passage bore 20 and opening from one side of the housing. A closure plug 73 for the outer end of the bore 72 serves as a fixed abutment for a biasing spring 74 preferably of the coiled compression type thrusting inwardly against the adjacent end portion of the valve plunger 71 about a reduced diameter stem portion 75 normally opposing the fixed plug 73 in spaced relation and serving to limit reciprocal movement of the valve plunger 71 toward the plug 73 in opposition to the spring 74.

Pressure fluid from the passage port 20 acts upon a shoulder 77 on the plunger valve 71 to move the valve plunger 71 in opposition to the bias of the spring 74 after predetermined pressure for which the spring 74 has been selected, has been attained. Such pressure movement of the valve 71 will cause cracking of a passage from the valve chamber 72 into a lubricating oil delivery passage 78 in the housing body 38 and leading through the face 48 to a duct 79 provided in the engine block 13 and in suitable manner communicating with the lubricating system for the engine.

A pressure relief vent opening 80 extends from the spring housing portion of the valve chamber 72 through the face 48 and communicates with a relief vent port 81 opening into the lubricating oil chamber within the engine block 13. Detrimental pressure build-up about the reducing valve 71 is avoided or relieved by a relief passage 82 leading from the valve chamber 72 from intermediate the output passage 78 and the relief passage 80 to a relief groove 83 recessed in the face 48 of the housing block 38 and communicating with the pump shaft bore 52 which in turn communicates through the engine block opening 53 with atmosphere. Additional pressure relief for the valve is provided through a port 84 communicating with a reduced diameter portion 85 at the inner end of the valve chamber and within which a slidable reduced diameter head 86 of the valve body 71 is reciprocable. The pressure relief vent port 84 opens through the face 48 of the housing and communicates with a relief recess 87 cored in the opposing face of the engine block 13 and communicatively overlapping a groove 88 in the face 48 leading to the shaft bore 52.

For variable displacement control of the modulator 54, the regulator valve structure 23 preferably comprises a reciprocable plunger valve body 89 longitudinally reciprocably slidably mounted within a valve chamber bore 90 opening from one side of the housing member 38 inwardly from the modulator chamber 47 and above the shaft bore 52 in such position as substantially to intersect or open into the upper end portions of the high pressure passage port 19 and the low pressure port 70 at the respectively opposite end portions of the valve chamber bore. The end portion of the valve chamber bore 90 which opens into the high pressure port 19 is of reduced diameter and provides the communication passage 24 through which high pressure fluid is operable against the head portion of the valve 89 to drive the valve away from an abutment limit shoulder 91 in opposition to a biasing spring 92 loaded for a predetermined pressure such as 50 pounds per square inch thrusting at one end against the base end of the valve plunger 89 and at its opposite end against a thick abutment 93 which is preferably in the form of a closure member threaded into the outer end portion of the valve chamber bore 90.

In the spring biased limit position of the valve 89 against the shoulder 91 pressure fluid communication by way of a blind end bore 94 through outlet ports 95 and an external valve groove 97 escapes into the passage 28 comprising a bore opening through the face 48 of the housing block 38 and communicating with a generally J-shaped groove 98 in the face 48 leading to a port or passage 99 (Figs. 3, 6, 7 and 9) by which pressure fluid is delivered in operation to the modulator sub-chamber 63 for maintaining the modulator 54 in the initial phases of operation and until predetermined pressure has been developed in its maximum eccentric position.

When the pump pressure exerted on the valve member 89 attains the predetermined or mean pressure for which the spring 92 has been selected, the valve member is moved in opposition to the spring and by compression of the spring to close off the pressure port or passage 28 by overlapping thereof by a solid or land area of the valve member intermediate the peripheral annular groove 97 and an annular peripheral somewhat wider groove 100 in the valve member which is in continual communication with a low pressure bleed port or passage 101 which opens through the housing face 48 into the pressure relief groove 83.

When pump pressure exceeds the predetermined mean, sensitivity of the valve 89 to the excess pressure causes it to move further in opposition to the spring 92 until communication is effected between the shunt duct 28 and the peripheral valve groove 100 and pressure thereby relieved or exhausted from the modulator sub-chamber 63.

Coincidental with such pressure relief from the modulator sub-chamber 63, pressure fluid is introduced to the opposite modulator sub-chamber 64 for thereby shifting the modulator toward reduced eccentricity, and thereby reduced displacement and pressure, until the mean pressure has been reestablished. Pressurizing of the sub-chamber 64 is accomplished as a result of the over-pressure movement of the valve 89 until pressure communication is effected by way of the pressure shunt duct or passage 27 which comprises a port through the housing face 48 to a groove 102 recessed therein and leading to a port 103 opening into the sub-chamber 64 (Figs. 3 and 6).

It will be observed that in the initial or pressure build-up phase of operation of the pump 14, as with the valve body 89 in its leftward position shown in Figure 7, the port or duct 27 is not covered by the valve body 89 and hence communicates through port 103 the modulator sub-chamber 64 with the low pressure passage portion 25 of the valve chamber bore 90 into which the low pressure or suction port 70 of the pump opens, hence providing low pressure to that modulator sub-chamber 64, while the modulator sub-chamber 63 is provided with high pressure through pump discharge lines 19—24, bores 94—97 and passages 28—98—99, thus effecting a pressure differential on the opposite ends of the modulator 54 assuring stability against torque forces tending to shift the modulator from maximum displacement position relative to the pump rotor.

Upon overtravel of valve body 89 to effect reversal of the pressure differential wherein the pressure shunt duct 28 is opened to atmosphere as described, and the shunt duct 27 communicates with the pressure groove 97 of the valve, automatic adjustment of the modulator 54 occurs substantially instantaneously; and at the mean pressure the valve shifts to neutral or modulator locking position wherein both of the shunt duct ports 27 and 28 are closed off by the valve.

Overriding of the valve 89 under sudden pressure surges is prevented by a stop member 104 having a stop end normally spaced a predetermined distance from the base end of the valve member 89. Herein the stop stem 104 is substantially smaller diameter and disposed concentrically within the coiled biasing spring 92 and comprises an extension from a plunger head 105 reciprocably slidably disposed within an inwardly opening counterbore 107 in the closure member 93. Normally the stop member head 105 seats against a shoulder 108 at the internal end of the counterbore 107. When it is desired to increase the operating or mean pressure of the pump 14 pressure fluid is introduced by way of the passage 31 which enters the closure member 93 concentrically with the counterbore 107 behind the stop member head 105.

In the initial phases of operation of the pump 14 the passage 31 may be neutralized or even vented for negative pressure by operation of the valve 29, for example. For increase in pressure operation of the pump, pressure fluid is conveyed under dynamic or static pressure head through the passage 31 to act on the stop member head 105 which causes the stop stem 104 to engage the base end of the valve member 89 and thus imposes a pressure fluid bias upon the valve member in addition to the spring bias to which it is normally subjected. For example, normally the spring bias upon the valve 89 may be approximately 50 pounds per square inch, whereas when the pressure fluid bias is added through the member 104, pressures up to 90 pounds per square inch may become the mean, thus accommodating variable requirements in operation of the vehicle with which the system is associated.

During variable displacement, constant selected pressure operation of the pump 14, the pump 15 operates with fixed displacement to scavenge hydraulic fluid from the transmission sump 34 and return the same to the motor sump 17. Complete separation between the circulatory systems of the pumps 14 and 15 is effected by the separation plate 40 of the pump unit 10. In addition, the plate 40 serves as a journal support for the pump driving shaft 11 which projects therethrough in a bearing 109 (Fig. 2) with the outer end portion of the shaft secured as by means of a key 110 co-rotatably into a rotor 111 of the pump 15.

Herein the pump 15 is of the sliding vane type and for this purpose the rotor 111 is equipped with radial equally spaced transverse slots 112 within which fluid displacing vanes 113 are slidably radially reciprocably accommodated and operatively controlled by inner and outer concentric backing rings 114 engaging the inner ends of the vanes and accommodated in respective recesses 115 in the opposite axial faces of the rotor 111 (Figs. 2 and 4).

A circular wall eccentrically disposed pump chamber 117 is provided as a recess within the outer housing member 39 of the pump unit. This chamber opens toward the inner face of the housing member 39 and is closed by the separator or divider plate 40 which on its opposite sides closes the pump chamber 47. A hollow boss 118 provides a bore which in part at least accommodates the suction passage 35 leading to the low pressure or inlet side of the pump 15. At the high pressure or discharge side of the pump 15 the discharge or delivery passage or duct 37 is accommodated by a hollow boss 119 preferably leading downwardly and opening into a registering complementary aperture 120 in the divider plate 40 and a complementary discharge passage 121 provided in a hollow outlet boss portion 122 in the lower portion of the main housing member 38 from which suitable conduit means continuing the passage 37 leads to the motor sump 17.

In order to assist in the fluid displacement function of the pump rotor 111 and the vanes 113, the face portion of the divider plate 40 exposed to the pump chamber 117 is preferably provided with arcuate generally kidney-shaped low pressure and high pressure fluid grooves 123 and 124 (Fig. 5) of gradually varying depth at respectively the low and high pressure sides of the pump.

In order to avoid leakage from between the joints at the interfaces between the divider plates 40 and respectively the housing members 38 and 39, suitable pressure seals are provided. To this end, an annular groove 125 encircles in slightly spaced relation the area on the outer face of the divider plate 40 which provides the inner wall for the pump chamber 117. Within this groove is seated a resilient sealing ring such as an O-ring 127 placed under compressive pressure by the opposing face of the housing member 39 clamped thereagainst. Similarly, a sealing roove 128 encircles in spaced relation the port 120 at the outer face of the divider plate and a resilient sealing O-ring 129 is seated therein and placed under compression by the housing member 39. At the interface of the divider plate 40 clamped against the housing member 38, a sealing ring 130 is set into a suitable annular groove surrounding the pump chamber 47 in spaced relation, and a sealing ring 131 is set into an annular groove in spaced relation about the port 120. These sealing rings 130 and 131 are placed under compression against the housing face 45.

From the foregoing it will be apparent that the single multi-function pump unit 10 serves to maintain a continuous cyclical pressure fluid operational system performing highly efficiently in a self-propelled motor vehicle organization with which associated. Not only are substantial manufacturing and assembly economies effected in the pump and control assembly but also compact space limitations are accommodated and operating efficiency attained, since both pumps in the unit are driven from a single shaft by a single power source.

It will be understood that modifications and variations may be effected without departing from the scope of the novel concepts of the present invention.

I claim as my invention:

1. In combination in a fluid displacement assembly, a one piece solid block housing member having a face arranged to be attached to a supporting member in face-to-face relation and in such face having a plurality of ports adapted to communicate with passages in said supporting member, said block having an opposite face with a pump recess therein of substantial size, a variable displacement pump in said recess, said block having inlet and outlet passages communicating with said variable displacement pump in said recess, means in said recess for varying the displacement of said pump, a closure plate closing said recess and confining the pump therein, a second plate carried by the outer side of said closure plate and having a pump recess therein opening towards the closure plate, a fixed displacement pump in said last mentioned pump recess, a common shaft connected to said variable displacement pump and said fixed displacement pump and extending through bores concentrically disposed in said block and said closure plate and opening through the first mentioned face of the block and through said closure plate, bearing means supporting said shaft in said respective bores, said shaft having an end portion thereof projecting beyond said first mentioned face of the block for attachment to a motivating member associated with the supporting member, said ports in said first mentioned face of the block having passages connecting the same with the discharge side of said variable displacement pump, and means within said block between said variable displacement pump recess thereof and said first mentioned face and operative to control said ports and the displacement of said variable displacement pump, said second plate having an inlet to the pump recess therein, said block having an outlet for said fixed displacement pump with a passage from said outlet through the block and said closure plate and said second plate.

2. In combination in a fluid displacement assembly, a one piece solid block housing member having a face arranged to be attached to a supporting member in face-to-face relation, said block having an opposite face with a pump recess therein of substantial size, a pump in said recess, said block having inlet and outlet passages communicating with said pump in said recess, a closure plate closing said recess and confining the pump therein, a second plate carried by the outer side of said closure plate and having a pump recess therein opening towards the closure plate, a pump in said last mentioned pump recess, a common shaft connected to said pumps and extending through bores concentrically disposed in said block, said closure plate and opening through the first mentioned face of the block and through said closure plate, bearing means supporting said shaft in said respective bores, said shaft having an end portion thereof projecting beyond said first mentioned face of the block for attachment to a motivating member associated with the supporting member, and means within said block between said pump recess thereof and said first mentioned face and operative to control said pump therein, said second plate having an inlet to the pump recess therein, said block having an outlet for said pump in said second plate with a passage from said outlet through the block and said closure plate and said second plate.

References Cited in the file of this patent
UNITED STATES PATENTS

| | | |
|---|---|---|
| 534,813 | Christensen | Feb. 26, 1895 |
| 1,527,685 | Huwiler | Feb. 24, 1925 |
| 1,766,520 | Klimek | June 24, 1930 |
| 1,868,161 | Dilg | July 19, 1932 |
| 1,984,664 | Teves | Dec. 18, 1934 |
| 2,124,395 | Caughey | July 19, 1938 |
| 2,177,724 | Kishline | Oct. 31, 1939 |
| 2,186,748 | Berger | Jan. 9, 1940 |
| 2,230,594 | Horton | Feb. 4, 1941 |
| 2,340,474 | Johnson | Feb. 1, 1944 |
| 2,406,964 | Orr | Sept. 3, 1946 |
| 2,451,279 | De Lancey | Oct. 12, 1948 |
| 2,531,808 | Eames | Nov. 28, 1950 |
| 2,601,288 | Hill | June 24, 1952 |
| 2,641,405 | Le Valley | June 9, 1953 |
| 2,678,607 | Hufferd et al. | May 18, 1954 |
| 2,699,724 | Murray et al. | Jan. 18, 1955 |
| 2,716,945 | Presnell | Sept. 6, 1955 |
| 2,720,171 | Harrington et al. | Oct. 11, 1955 |
| 2,768,585 | Hardy | Oct. 30, 1956 |